B. H. URSCHEL.
UNIVERSAL JOINT.
APPLICATION FILED SEPT. 6, 1917.
1,258,278.
Patented Mar. 5, 1918.
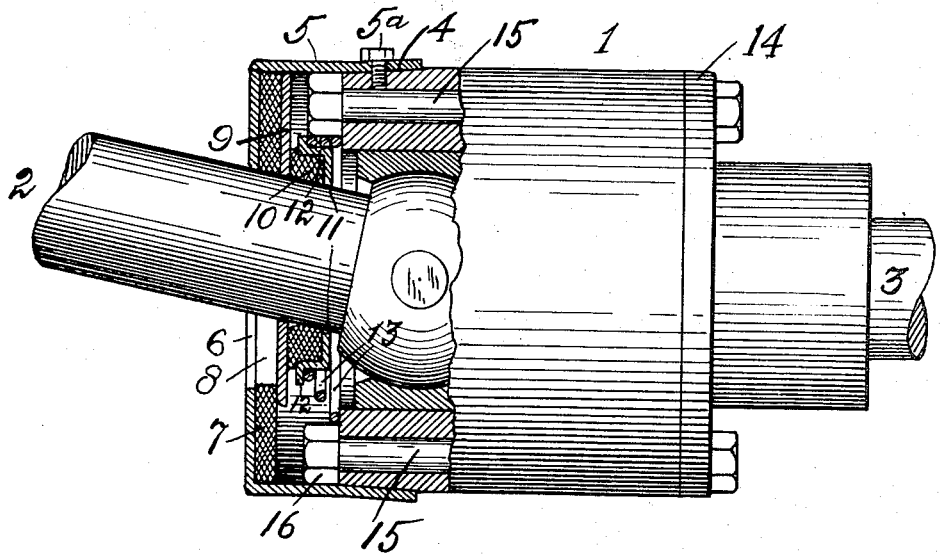

UNITED STATES PATENT OFFICE.

BERTIS H. URSCHEL, OF BOWLING GREEN, OHIO, ASSIGNOR TO THE UNIVERSAL MACHINE COMPANY, OF BOWLING GREEN, OHIO, A CORPORATION.

UNIVERSAL JOINT.

1,258,278.      Specification of Letters Patent.      Patented Mar. 5, 1918.

Application filed September 6, 1917. Serial No. 189,909.

*To all whom it may concern:*

Be it known that I, BERTIS H. URSCHEL, a citizen of the United States, residing at Bowling Green, in the county of Wood and State of Ohio, have invented certain new and useful Improvements in Universal Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to devices for closing the open end of the housing or "boot" for universal joints such as are employed in automobile practice. Its object is to prevent the access of dirt to the joint, to prevent the escape of lubricant and to provide a practically frictionless noiseless closure for the opening through which one of the shaft-members of the joint extends.

To these ends my device consists of the devices, construction and arrangement of parts hereinafter described, and shown and illustrated in the single figure of the accompanying drawing which represents, in side elevation, a universal joint of well known construction, part of the housing of the joint being broken away to disclose the closure hereinafter described, in central vertical sectional elevation.

In the drawings 1 is a housing case or boot for the universal joint, 2 and 3, shafts connected by the joint, one of the shafts being a driving member the other being a driven member. One end of the casing is externally slightly tapered toward its end, as at 4. 5 is a circular cup-shaped cap the margin of which flares slightly to fit closely upon the taper 4 of the casing. The cap may be secured in place by means of screws 5ª or other suitable devices. Through the center of the cap 5 is a circular opening 6 of such dimensions as to permit the required angular deflection of the shaft 2 which extends through the opening. 7 is a washer of felt or similar material which fits closely against the inner side of the flat end-wall of the cap and having therethrough an opening 8 which registers with and corresponds to the opening 6. 9 is a thin metal plate or disk, of less diameter than the interior of the cap 5 and having therethrough an opening which receives with a close fit the shaft 2. There is sufficient space between the outer edge of the disk 9 and the wall of the cap to permit the required lateral deflection of the shaft-member 2. Closely embracing the shaft 2 and pressing against the inner side of the disk 9 is a circular pad 10 of felt, flax, packing or the like, which pad is seated in a cup-shaped washer 11 which loosely embraces the shaft and has a flange 12. 13 is a conically coiled spring encircling the shaft and pressing outwardly against the flange 12 and inwardly against the adjacent end of the casing 1 as clearly shown in the drawing.

The end of the housing 1 opposite the cap 5 is closed by plate 14 which is secured in place by bolts 15 which extend longitudinally through the wall of the housing. The inner end of each of these bolts is threaded and carries a nut 16 a flat side of which fits against the inner wall of the flange of the cap 5 which thus serves as a lock which prevents the turning of the nut.

The parts being assembled as shown, the operation of the device will be obvious. With the angular movement of the shaft 2 the metal plate 9 slides upon the felt piece 7. The felt pad 10 and the washer 11 also move laterally with the shaft. The several parts 7, 9, 10 and 11 are constantly pressed outwardly by the spring 13 which accommodates itself to the movement of these parts and of the shaft. It will be seen that the pressure upon the felt pieces 7 and 10 tends to expand inwardly their inner edges and to cause them to serve as packing-glands.

Having described my invention, what I claim and desire to secure by Letters Patent, is—

1. In a device of the described character, a housing, an angularly movable shaft, a cap fitted upon the housing and through which passes the shaft, a felt washer in the cap, a plate slidable upon the inner side of the felt washer and which embraces and is laterally movable with the shaft, and spring-pressed means for holding the plate and the washer in close contact.

2. In a device of the described character, a housing, an angularly movable shaft, for the housing a cap through which passes the shaft, a felt washer fixed in the cap, a plate slidable upon the inner side of the washer and which embraces and is laterally movable with the shaft, a pad of packing-material which embraces the shaft at the inner side of the plate, and means for maintaining outward pressure upon the felt washer the plate and the pad.

3. In a universal joint, a driving shaft and a driven shaft, a housing for the adjacent ends of said shaft-members, a closure for one end of the housing comprising a cap for the housing, said cap having therethrough an opening through which passes one of said shaft-members, said opening corresponding in area to the angular movement of said shaft-member, in the cap a felt washer having an opening corresponding to the said opening in the cap, a plate having an opening which embraces the shaft and which slides upon said felt washer, on the inner side of the plate a felt pad which embraces the shaft, a washer which engages the felt pad and a spring engaged with the housing and with the washer and which presses outwardly the washer the pad the plate and the felt washer.

4. In a device of the described character, a housing, a closure for one end of the housing, threaded bolts which engage said closure, nuts on said bolts, and—on the other end of said housing—a cap which engages and locks said nuts.

In testimony whereof I affix my signature in presence of two witnesses.

BERTIS H. URSCHEL.

Witnesses:
 ETHEL SHUMAN,
 GERTRUDE BRACKER.